US012649493B1

(12) United States Patent
Brown

(10) Patent No.: US 12,649,493 B1
(45) Date of Patent: Jun. 9, 2026

(54) OBJECT DETECTION USING SPATIAL SEGMENTATION

(71) Applicant: Zoox, Inc., Foster City, CA (US)

(72) Inventor: Kenneth Nathan Brown, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 110 days.

(21) Appl. No.: 18/622,109

(22) Filed: Mar. 29, 2024

(51) Int. Cl.
*B60W 60/00* (2020.01)
*G01S 17/58* (2006.01)

(52) U.S. Cl.
CPC ......... *B60W 60/0027* (2020.02); *G01S 17/58* (2013.01); *B60W 2420/408* (2024.01)

(58) Field of Classification Search
CPC ......... B60W 60/0027; B60W 2420/408; G01S 17/58
USPC .......................................................... 701/23
See application file for complete search history.

(56) References Cited

U.S. PATENT DOCUMENTS

| | | | | |
|---|---|---|---|---|
| 10,338,594 | B2 * | 7/2019 | Long ..................... | G05D 1/0246 |
| 10,474,162 | B2 * | 11/2019 | Browning ........... | B60W 30/095 |
| 11,022,971 | B2 * | 6/2021 | Della Penna ........ | G08G 1/0129 |
| 11,340,632 | B2 * | 5/2022 | Zlot ...................... | G08G 1/161 |
| 11,353,577 | B2 * | 6/2022 | Liu ........................ | G01S 13/865 |
| 12,013,457 | B2 * | 6/2024 | Urtasun ................ | G01S 13/931 |
| 12,397,780 | B2 * | 8/2025 | Beller ............... | B60W 50/0097 |

| | | | | |
|---|---|---|---|---|
| 2017/0031015 | A1 * | 2/2017 | Mei ........................ | G01S 13/931 |
| 2021/0114617 | A1 * | 4/2021 | Phillips .............. | G01C 21/3453 |
| 2023/0041975 | A1 * | 2/2023 | Caldwell ........... | B60W 60/0027 |

FOREIGN PATENT DOCUMENTS

| | | | | |
|---|---|---|---|---|
| CN | 116745191 A | * | 9/2023 | ........ B60W 60/0011 |
| JP | 2022547766 A | * | 11/2022 | .............. G01S 7/411 |

OTHER PUBLICATIONS

"Vehicle Trajectory Prediction Based on Adaptive Edge Generation." Electronics (Basel) (2024): n. pag. Web. (Year: 2024).*
Weon, Ihn-Sik, Soon-Geul Lee, and Jae-Kwan Ryu. "Object Recognition Based Interpolation With 3D Lidar and Vision for Autonomous Driving of an Intelligent Vehicle." IEEE access 8 (2020): 65599-65608. Web. (Year: 2020).*

* cited by examiner

*Primary Examiner* — Erin D Bishop
*Assistant Examiner* — Keith A von Volkenburg
(74) *Attorney, Agent, or Firm* — Lee & Hayes, P.C.

(57) ABSTRACT

Techniques for object detection based on sensor data are discussed herein. In some cases, the techniques described herein include receiving lidar data and radar data associated with an environment of a vehicle, wherein the lidar data comprises a first set of lidar points associated with a first portion of the environment. The techniques further include determining, based on the radar data, a first subset of the first set that is associated with a dynamic movement pattern; determining a first ratio based on the first subset and the first set. Further, the techniques include, based at least in part on determining that the first ratio exceeds a threshold, determining that the first portion is associated with a dynamic object in the environment. In some examples, the vehicle can be controlled based on the dynamic object.

20 Claims, 5 Drawing Sheets

300

SELECT HIGHEST-RATIO
SUBSET
302

ASSOCIATE SELECTED
SUBSET WITH A DYNAMIC
OBJECT
304

RECURSIVELY ASSOCIATE
NEIGHBORING DYNAMIC
SUBSETS
306

DETERMINE WHETHER
RECURSIVE OUTPUT
CORRESPONDS TO A
DYNAMIC OBJECT
308

SUBSET H
310H

SUBSET F
310F

SUBSET E
310E

312

SUBSET D
310D

SUBSET C
310C

SUBSET B
310B

SUBSET A
310A

SUBSET H
310H

SUBSET F
310F

SUBSET E
310E

312

SUBSET D
310D

400 ⇘

OBJECT DETECTION USING SPATIAL SEGMENTATION

BACKGROUND

Autonomous vehicles perform computer vision operations such as object detection. However, computer vision operations can be inaccurate and/or inefficient, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
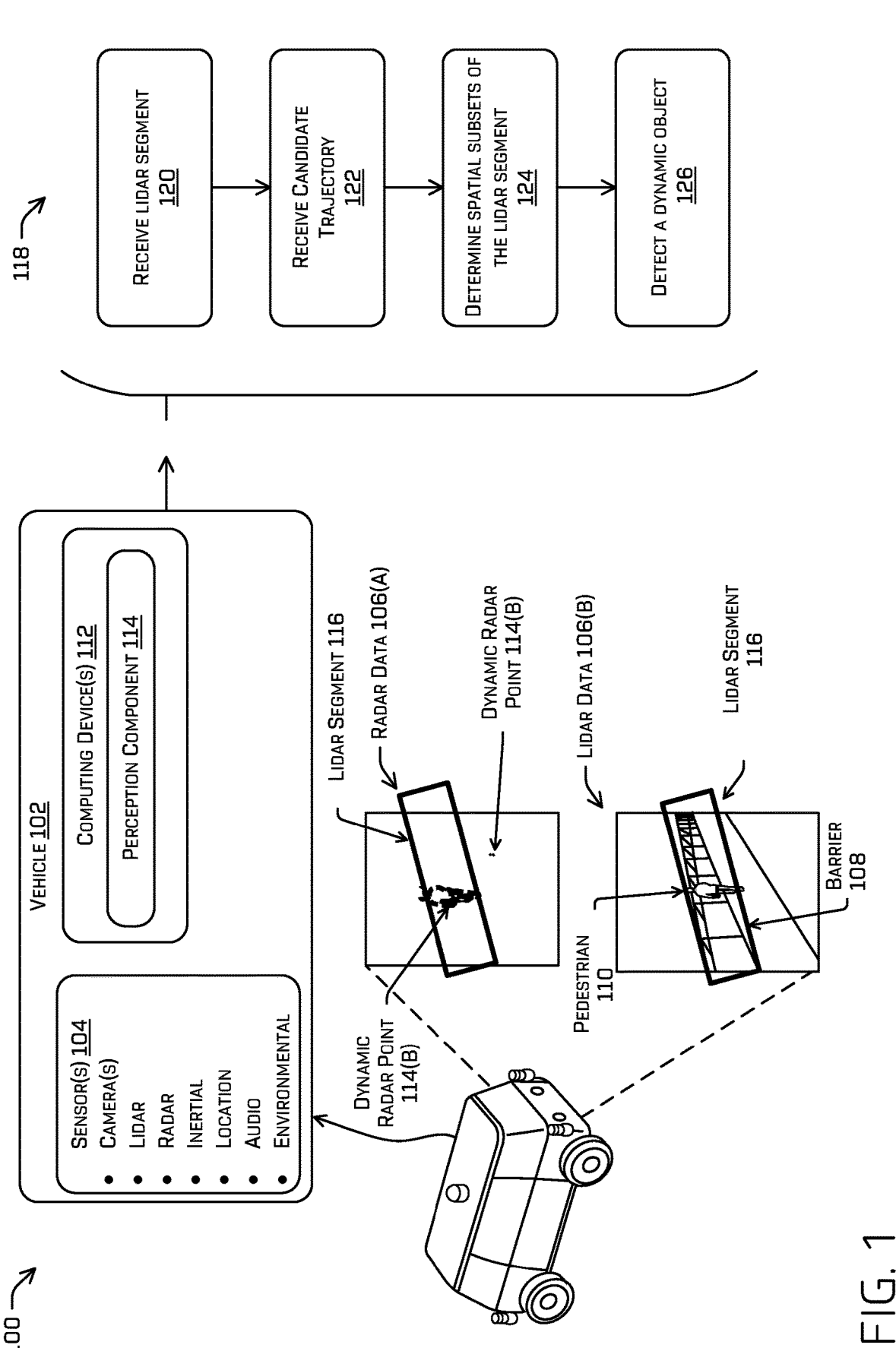
FIG. 1 provides an example environment for performing the techniques described herein.

The present disclosure describes techniques for detecting a dynamic object based on sensor data. In some cases, the techniques described herein enable determining whether a static object segment determined based on first sensor data (e.g., lidar data) includes a dynamic object that may have remained undetected due to proximity to the static object (e.g., due to visual merger with the static object, due to occlusion by the static object, and/or the like). In some cases, an example system uses second sensor data (e.g., radar data) to designate sensor data points (e.g., lidar points) in the static object segment as either dynamic or static. For example, the system may determine that a first sensor data point in the static object segment is dynamic if a corresponding second sensor data point (e.g., a radar point) in the second sensor data is determined to be dynamic (e.g., is determined to have a velocity that exceeds a threshold, such as a threshold of 0.45 meters per second). In some cases, after the system determines which sensor data points in the first sensor data are dynamic, the system determines subsets of the first sensor data that correspond to portions of the environment associated with the static object segment (e.g., portions associated with arclength sections of a candidate trajectory arclength that spans along the static object segment). The system may then designate an environment portion as potentially part of a dynamic object if the corresponding subset of first sensor data has a dynamic point ratio that exceeds a threshold. The system may then determine whether the static object segment is associated with an "under-segmented" dynamic object based on the environment portion designations. In some cases, one or more boundaries of an environment portion are determined based on one or more lines that have a defined angle with respect to (e.g., that are perpendicular to) a representation of a candidate trajectory (e.g., an arclength associated with the candidate trajectory).

In some cases, the techniques described herein enable improved dynamic object detection (e.g., based on lidar data). This dynamic improved object detection may enable controlling a vehicle in a safer manner based on a more accurate detection of object(s) (e.g., dynamic object(s)) in the vehicle's environment. Accordingly, the techniques discussed herein may improve the safety of occupants of an autonomous vehicle that incorporates the techniques discussed herein. Moreover, the techniques may improve the efficiency of an autonomous vehicle in accomplishing a mission such as, for example, delivering passengers and/or cargo, surveying a region, and/or the like.

In some cases, the techniques described herein include determining whether a segment of lidar data that is determined to be associated with a static object that also includes a dynamic object. This determination may be based on radar data. In some cases, by using both lidar data and radar sensor data, the techniques described herein enable more accurately identifying dynamic objects that may be erroneously grouped with static objects in lidar segmentation operations. However, a person of ordinary skill in the relevant technology will recognize that the techniques described herein may be performed in relation to one or more sensor data modalities in addition to and/or instead of at least one of the lidar or radar. In some cases, the techniques described herein include determining whether a segment of sensor data associated with a first sensor modality represents a dynamic object based on sensor data associated with a second sensor modality. The first sensor modality may be a sensor modality other than lidar data. The second sensor modality may be a sensor modality other than radar data. In some cases, the techniques described herein in relation to lidar data can be performed in relation to other type(s) of sensor data (e.g., other type(s) of sensor data that may be segmented to detect object(s)). In some cases, the techniques described herein in relation to radar data may be performed in relation to other type(s) of sensor data (e.g., other type(s) of sensor data that may be used to determine one or more velocities and/or movement patterns associated with one or more points in an environment).

In some cases, the techniques described herein include determining a "candidate segment" of lidar data (e.g., or other sensor data). A candidate lidar segment may be a segment (e.g., a subset) of lidar data that is determined to potentially include a dynamic object (e.g., an "under-segmented" dynamic object, such as a dynamic object that has not been detected based on its proximity to another object, such as to another static object). A candidate segment may be associated with the detection of a static object.

The system may determine that a segment of lidar data is a candidate segment if the lidar segment satisfies one or more requirements. For example, one requirement may require that a lidar segment only be determined to be a candidate segment if the segment has a measure of area (e.g., an area of a convex hull that includes the object) that exceeds a threshold (e.g., a threshold of two square meters). One objective behind this requirement may be to filter out segments (e.g., static object segments) that are too small to contain a dynamic object and/or to contain a dynamic object that is deemed relevant to a vehicle's trajectory planning. For example, in some cases, a lidar segment corresponding to the detection of a traffic code (e.g., with an area of 0.5 square meters) may be excluded. As another example, in some cases, a lidar segment corresponding to the detection of a barrier (e.g., with an area of 4.0 square meters) may be included.

As another example, another requirement for determining that a lidar segment is a candidate segment may relate to whether a measure of proximity associated with the lidar segment and a vehicle (e.g., a vehicle associated with the sensor(s) used to capture lidar data and/or sensor data) falls below a threshold. For example, the system may require a lidar segment determined to be a candidate lidar segment includes a threshold number of (e.g., at least one, at least two, and/or the like) lidar points that are within a threshold distance (e.g., fifteen meters) of a vehicle's location at a time associated with the lidar data (e.g., at a time at which lidar data was captured and/or recorded).

As another example, another requirement for determining that a lidar segment is a candidate segment may require that a lidar segment only be determined to be a candidate segment if: (i) a count of radar points associated with the lidar segment that are determined to be static exceeds a threshold, and/or (ii) a count of radar points associated with the lidar segment that are determined to be dynamic exceeds a threshold (e.g., a threshold determined based on the dynamic radar point count). In some cases, the system may identify a set of radar points associated with a lidar segment (e.g., a set of radar points that are determined to be associated with the same region of the environment as the lidar segment's region), determine which of those radar points are static and/or dynamic, and determine whether the lidar segment may be determined to be a candidate segment based on a count of static radar points and/or a count of dynamic radar points. For example, the system may determine that a lidar segment is a candidate segment only if the radar points associated with the lidar segment include a threshold number of (e.g., at least one) static radar points and/or a threshold number of (e.g., at least one) dynamic radar points.

As described above, a radar point may be classified as static and/or dynamic based on whether a velocity associated with the radar point (e.g., a velocity determined based on radar data, such as based on a set of radar point clouds captured across time) exceeds a threshold. For example, in some cases, the system may determine that a radar point is dynamic (e.g., is associated with a dynamic movement pattern) if a velocity measure associated with the radar point exceeds a threshold. In some cases, a radar point is associated with a dynamic movement pattern if a velocity measure associated with the radar point exceeds a threshold. In some cases, a radar point is associated with a static movement pattern if a velocity measure associated with the radar point falls below or equals a threshold. In some cases, the velocity measure associated with a radar point may be an output of a radar sensor. In some cases, the velocity measure associated with a radar point may represent an instantaneous velocity associated with that point (e.g., as determined using a Doppler velocity measurement technique). In some cases, the velocity measure associated with a radar point may be determined based on the movement in the position of radar points associated with a corresponding radar point track across time.

Accordingly, in some cases, a lidar segment may be determined to be a candidate segment if at least one of the following exceeds a corresponding threshold: (i) a count of radar points associated with the lidar segment whose velocity measures fall below or equals a threshold, and/or (ii) a count of radar points associated with the lidar segment whose velocity measures exceed a threshold. For example, if the velocity threshold is 0.45 meters per second, and if the threshold for the static radar point count and the threshold for the dynamic radar point count are both one, then a lidar segment with associated radar velocities of [0.1, 0.3, 0.8, 1.2] meters per second may be selected as a candidate segment, while a lidar segment associated with radar velocities of [0.2, 0.3, 0.4, 0.5] meters per second may be discarded.

As another example, another requirement for determining whether a lidar segment is a candidate segment may require that a lidar segment only be determined to be a candidate segment if the segment's static radar point ratio exceeds a threshold (e.g., a threshold of 1.0). A lidar segment's static radar point ratio may be a ratio associated with a count of static radar points associated with the lidar segment and a count of dynamic radar points associated with the lidar segment. In some cases, a lidar segment's static radar point threshold may be determined based on a ratio of static radar points that fall within the lidar segment's region to the dynamic radar points that fall within the same region. For example, given a threshold of one, a lidar segment that is associated with 24 static and 8 dynamic radar points (e.g., a lidar segment with a static radar point ratio of 3.0) may be eligible to be determined as a candidate segment (e.g., if the lidar segment satisfies other requirement(s) for candidate segment determination). However, a lidar segment that is associated with 10 static and 20 dynamic radar points (e.g., a lidar segment with a static radar point ratio of 0.5) may be ineligible to be determined as a candidate segment. In some cases, the objective behind requiring that a candidate segment's static radar point ratio exceeds a threshold may be to avoid over-segmentation of static objects. For example, the objective may be to avoid segmenting a static object based on one or more multi-path static radar observations associated with a larger dynamic object.

In some cases, a candidate segment is a lidar segment with: (i) an associated convex hull area that exceeds an area threshold, (ii) a required number of lidar points within a threshold proximity of a vehicle associated with capturing the lidar data, (iii) a required number of associated static radar points and a required number of associated dynamic radar points, and (iv) a static radar point ratio that exceeds a threshold (e.g., a threshold of one, such that the lidar segment is associated with more static radar segments than dynamic radar segments). An example of such a lidar segment is a lidar segment associated with a detection of a barrier while a dynamic object (e.g., a pedestrian, a cyclist, a skater, and/or the like) is moving along the barrier. In this example, a lidar segmentation operation may incorrectly fail to segment the lidar points corresponding to the dynamic object in a distinct segment. Another example of a lidar segment that may be classified as a candidate segment may be a lidar segment associated with a parked vehicle while a dynamic object is moving nearby. In this example, a lidar segmentation operation may incorrectly group the lidar points associated with the vehicle and the lidar points associated with the dynamic object as being part of a single lidar segment.

In some cases, the techniques described herein include associating a lidar point (e.g., or a sensor data point associated with sensor data of a different sensor modality) with one or more corresponding radar points (e.g., or sensor data point(s) associated with sensor data of one or more different sensor modalities). In some cases, the system may associate lidar point(s) associated with a lidar segment (e.g., a candidate lidar segment as determined based on the techniques described above, a lidar segment that is determined to represent a static object, and/or the like) to corresponding points in the radar data.

In some case, to determine a radar point associated with a lidar point, the system may determine which radar point is the most proximate (e.g., is the "nearest neighbor") to the lidar point based on location(s) associated with lidar data of an environment and location(s) associated with radar data of the same environment. In some cases, to identify the radar point that is most proximate to a lidar point, the system may generate and/or query a tree structure, such as a k-dimensional tree (k-d tree), of radar points represented by the radar data. In some cases, each node of the k-d tree may correspond to a radar point in the radar data associated with the environment. To generate the k-d tree, the system may recursively partition the set of radar points along alternating dimensions. An example of generating a k-d tree of radar points associated with two-dimensional coordinates is provided below. However, a person of ordinary skill in the relevant technology will recognize that the techniques described herein and/or the techniques of the provided example can be extended to any number of dimensions, such as to three-dimensional radar data.

For example, given a set of eight radar points with the following (x, y) coordinates: (2, 3), (5, 4), (9, 6), (4, 7), (8, 1), (7, 2), (1, 8), (3, 5), the system may first select one of the radar points as the root node based on the x-coordinate value associated with that point. For example, the system may determine that, since the median x-coordinate value for the eight radar points is four, the root node should be associated with the point (4, 7). The system may then partition the eight radar points into two subsets based on whether their x-coordinates exceeds four. Accordingly, the system may determine a first radar subset including the radar points {(2, 3), (1, 8), (3, 5)} and a second radar subset including the radar points {(5, 4), (9, 6), (8, 1), (7, 2)}. The system may assign one determined radar subset (e.g., the first radar subset) to the left branch of the tree and another determined radar subset (e.g., the second radar subset) to the right branch of the tree. The system may then partition the first and second subsets, but this time based on the y-coordinate values. For example, in the left branch, the system may determine that, because the median y-coordinate value for the left branch is five, the second-level left node should be (3, 5). Based on this determination, the system may partition the first subset to a third radar subset {(2, 3)} whose y-coordinate value does not exceed five and a radar subset ({1, 8}) whose y-coordinate value exceeds five. Similarly, in the right branch, the system may determine the median y-coordinate value of two and a second-level right branch value of (7, 2). Based on this determination, the system may partition the second subset to a fifth radar subset {(8, 1)} whose y-coordinate value does not exceed five, and a sixth subset set {(5, 4), (9, 6)} whose y-coordinate values exceed five. This process may recursively continue with alternating dimensions until all radar points are assigned to k-d tree nodes.

In some cases, the system may query a k-d tree based on a lidar point to determine a radar point associated with that lidar point. In some cases, a k-d tree is queried by recursively traversing the tree from the root node via comparing the lidar point coordinates to the current node based on the dimension being considered at that level of the tree. The query may navigate left or right depending on whether the lidar point coordinates exceed the node coordinates in accordance with the relevant dimension until reaching a leaf node. After reaching a leaf node, the query may conditionally backtrack to visit previously unexplored branches that might contain closer points to the lidar point coordinates. Backtracking may, for example, be based on whether there are nodes in a data structure (e.g., priority queue and/or a stack) that keeps track of the nodes to be visited. During the traversal, the query may maintain and update the smallest distance between a k-d tree node and the lidar point coordinates. If the distance between the lidar point and a traversed node is greater than the current smallest distance, the entire subtree rooted at the traversed node may be discarded from the data structure. The backtracking process may continue until all relevant nodes have been explored and/or the data structure is empty. Once the search is complete, the query may return the node associated with the smallest distance. The radar point represented by this node may be the radar point that is associated with the lidar point used to query the k-d tree.

In some cases, the techniques described herein include determining whether a lidar point (e.g., or a sensor data point associated with sensor data of a different sensor modality) is dynamic. In some cases, the system may determine which lidar points associated with a lidar segment (e.g., a candidate lidar segment as determined based on the techniques described above, a lidar segment that is determined to represent a static object, and/or the like) are dynamic. In some cases, the system determines whether a lidar point is dynamic based on whether a radar point determined to be associated with the lidar point is dynamic. In some cases, if the associated radar point is dynamic, the system determines that the lidar point is dynamic. In some cases, if the associated radar point is not dynamic, the system determines that the lidar point is not dynamic. In some cases, if the associated radar point is static, the system determines that the lidar point is static.

In some cases, the techniques described herein divide a lidar segment (e.g., a candidate lidar segment as determined based on the techniques described above, a lidar segment that is determined to represent a static object, and/or the like) into one or more lidar segment subsets. A lidar segment subset may include a subset of the lidar data. In some cases, the system determines one or more portions of an environment, and then divides the lidar segment points into subsets based on the determined environment portions. For example, given P environment portions, the system may determine P lidar segment subsets, where each of the P lidar segment subsets includes a subset of the lidar segment points that are associated with (e.g., whose locations are within) a respective one of the environment portions.

In some cases, to determine the environment portion(s), the system determines an arclength along a trajectory (e.g., a candidate trajectory being evaluated, a vehicle's current trajectory, and/or the like). The system may divide the arclength into a set of arclength portions, such as into fixed-length intervals. Each environment portion may include an area associated with a respective one of the arclength portions. For example, one dimension of an environment portion is determined based on the length of the corresponding arclength. Another dimension of the environment portion may be determined based on a predefined value, based on a vehicle's corridor, based on a width and/or length of the lidar segment, and/or the like. For example, if the lidar segment is being divided along a vertical dimension, the environment portions may be regions that span corresponding arclength portions and the horizontal length of the segment. As another example, if the lidar segment is being divided along a horizontal dimension, the environment portions may be regions that span corresponding arclength portions and the horizontal length of the segment.

Accordingly, in some cases, a lidar point may be assigned to a respective subset (e.g., a spatial bin) based on the position of the lidar point relative to the vehicle's heading.

For example, if the arclength associated with a trajectory spans ten meters, the system may divide the arclength into ten arclength portions. The lidar segment points may then be divided into ten subsets. Each subset may include lidar segment points that spatially align with one of the ten determined arclength portions. In some cases, the number of arclength portions may depend on the length of the lidar segment being evaluated and/or the average velocity associated with the lidar segment points. For example, in some cases, the interval length used to divide the arclength into arclength portions may depend on a measure of velocity (e.g., an average velocity) associated with the lidar segment's associated radar points. For example, in some cases, as this measure of velocity increases, the interval length increases and/or the number of arclength portions increases. In some cases, the system determines a subset of lidar points in a candidate lidar segment by determining an environment portion, such as a two-dimensional portion with a dimension determined based on the length of a trajectory arclength portion and/or a dimension determined based on a size of a corridor (e.g., a safety corridor) associated with the vehicle.

In some cases, the techniques described herein include determining a dynamic point ratio for a subset of lidar data (e.g., a subset of lidar data associated with a candidate lidar segment, such as a subset determined based on spatial alignment with a corresponding arclength portion associated with a candidate trajectory arclength). In some cases, a subset's the dynamic point ratio describes a ratio of dynamic lidar points in the subset. For example, the dynamic point ratio may describe a ratio of a count of dynamic lidar points in the subset to a count of static lidar points in the subset. As another example, the dynamic point ratio may describe a ratio of a count of dynamic lidar points in the subset to a total count of lidar points in the subset. As described above, determining whether a lidar point is dynamic may be based on whether a velocity measure associated with the corresponding radar point(s) exceeds a threshold. For example, in some cases, lidar points whose associated radar velocity exceeds a threshold (e.g., 0.45 m/s) are labeled as dynamic. This threshold may be selected dynamically, for example based on the expected velocity range of object(s) in the environment, the noise characteristics of the radar sensor, and/or the required certainty of dynamic object detection.

As described above, in some cases, lidar points in a candidate segment may be divided into a subset of spatial lidar subsets such that spatial subset is associated with a region (e.g., a portion) of the environment. As further described above, in some cases, each lidar point is associated with a dynamic or static designation based on whether the radar point(s) associated with the lidar point have a threshold-exceeding velocity measure. Accordingly, in some cases, after determining a spatial subset of lidar points in the candidate segment, the system may: (i) identify which of the lidar points in the subset are dynamic and which are static, (ii) determine a count of lidar points in the subset that are dynamic, (iii) determine a count of lidar points in the subset that are static, and/or (iv) determine the dynamic point ratio based on the dynamic point count and/or the static point cloud (e.g., based on a ratio of the dynamic point count to the static point count associated with the spatial lidar segment).

In some cases, the techniques described herein include determining whether a subset of lidar points (e.g., a lidar subset determined by spatially diving the lidar points associated with a candidate lidar segment) is potentially dynamic. In some cases, the system determines whether a lidar subset is potentially dynamic based on the dynamic point ratio associated with the lidar subset. In some cases, the system may determine that a lidar subset is potentially dynamic if the dynamic point ratio associated with the lidar subset exceeds a threshold (e.g., a threshold of one, which indicates that the lidar subset includes more dynamic lidar points than static lidar points). For example, if a lidar subset has fifteen dynamic lidar points and five static lidar points, the system may determine that the lidar subset is potentially dynamic (e.g., because the dynamic point ratio of the subset, which may be $15/5=3.0$, exceeds a threshold of 1.0). In some cases, if the dynamic point threshold associated with a lidar subset falls below or equals a threshold, the system determines that the lidar subset is not potentially dynamic and/or is static. For example, if a lidar subset has five dynamic lidar points and ten static lidar points, the system may determine that the lidar subset is not potentially dynamic and/or is static (e.g., because the dynamic point ratio of the subset, which may be $5/10$-0.5, falls below a threshold of 1.0).

In some cases, the techniques described herein include determining whether a candidate lidar segment is associated with (e.g., includes, represents, and/or the like) one or more dynamic object(s) based on at least one of: (i) dynamic point ratio(s) associated with the spatial subset(s) of the candidate lidar segment, or (ii) which of the spatial subsets of the candidate lidar segment are determined to be potentially dynamic. The system may use one or more different techniques for determining whether a candidate lidar segment includes dynamic object(s) based on dynamic point ratios and/or spatial subset designations. Examples of those techniques are described below. These techniques may associate a dynamic object with a subset of spatial lidar subsets. After the system associates a dynamic object with such a subset, the system may determine that the dynamic lidar points in that subset correspond to detections of a dynamic object.

For example, in some cases, the system may determine that each largest contiguous (e.g., adjacent) set of lidar subsets is associated with a dynamic object. For example, if the sequence of five spatial subsets as determined based on spatial positions of those subsets is $\{S_1 \rightarrow S_2 \rightarrow S_3 \rightarrow S_4 \rightarrow S_5\}$ (where each Sn is a spatial lidar subset), and if $S_1$, $S_3$, $S_4$, and $S_5$ are designated as being potentially dynamic while $S_2$ is designated as not being potentially dynamic, then the system may determine that $\{S_1\}$ corresponds to a first dynamic object and $\{S_3, S_4, \text{and } S_5\}$ corresponds to a second dynamic object.

As another example, in some cases, the system may determine that each largest contiguous set of lidar subsets is associated with a dynamic object if that set satisfies one or more threshold conditions (e.g., a size threshold determined based on a dimension size associated with the set and/or based on a number of spatial segments in the set). For example, if: (i) the sequence of five spatial subsets as determined based on spatial positions of those subsets is $\{S_1 \rightarrow S_2 \rightarrow S_3 \rightarrow S+ \rightarrow S_5\}$ (where each Sn is a spatial lidar subset), (ii) $S_1$, $S_3$, $S_4$, and $S_5$ are designated as being potentially dynamic while $S_2$ is designated as not being potentially dynamic, and (iii) the threshold condition requires that a largest contiguous segment be associated with a dynamic object only if it includes at least two spatial subsets, then the system may determine $\{S_3, S_4, \text{and } S_5\}$ corresponds to a dynamic object while $\{S_1\}$ does not. This may be because $\{S_1\}$ includes one contiguous spatial subset, which is less than the threshold of two. This thresholding may be configured to exclude and/or discard: (i) spatial lidar subsets that are designated as being potentially dynamic as a result of radar errors, and/or (ii) spatial lidar subsets that include dynamic objects that are determined to be too small to be relevant to a vehicle's trajectory planning.

As another example, in some cases, the system may determine that a candidate lidar segment with S spatial subsets is associated with a dynamic object by: (i) selecting the spatial subset that has the highest dynamic point ratio, and (ii) starting from the selected dynamic point ratio, recursively traversing the sequence of spatial bins in any available direction until the traversal reaches a spatial subset that is determined to not be potentially dynamic. For example, if: (i) the sequence of five spatial subsets as determined based on spatial positions of those subsets is $\{S_1 \rightarrow S_2 \rightarrow S_3 \rightarrow S_4 \rightarrow S_5\}$ (where each Sn is a spatial lidar subset), (ii) $S_2$, $S_3$, $S_4$, and $S_5$ are designated as being potentially dynamic while $S_1$ and $S_2$ is designated as not being potentially dynamic, and (iii) $R(S_5)<R(S_2)<R(S_4)<R(S_3)$ (where $R(x)$ is the dynamic point ratio associated with the spatial subset x), then the system may determine that $\{S_3, S_4, \text{ and } S_5\}$ corresponds to a dynamic object. To do this, the system may first select $S_3$ as the spatial subset with the highest dynamic point ratio. Afterward, in the backward direction, the system may: (i) first traverse to $S_2$ because $S_2$ is the predecessor of $S_3$ and is determined to be potentially dynamic, and (ii) refrain from traversing to $S_1$ because $S_1$ is the predecessor of $S_2$ but is determined to not be potentially dynamic. Moreover, in the forward direction, the system may: (i) first traverse to $S_4$ because $S_4$ is the successor of $S_3$ and is determined to be potentially dynamic, (ii) then traverse to $S_5$ because $S_5$ is the successor of $S_4$ and is determined to be potentially dynamic, and (iii) refrain from a subsequent forward traversal because $S_5$ is the final spatial bin in the sequence and thus forward traversal is unavailable.

As another example, in some cases, the system may determine that a candidate lidar segment with S spatial subsets is associated with a dynamic object by: (i) selecting the spatial subset that has the highest dynamic point ratio, (ii) starting from the selected dynamic point ratio, recursively traversing the sequence of spatial bins in any available direction until the traversal reaches a spatial subset that is determined to not be potentially dynamic, and (iii) determining that the set of spatial subsets resulting from the recursive traversal satisfies one or more threshold conditions (e.g., a size threshold determined based on a dimension size associated with the set and/or based on a number of spatial segments in the set). For example, if: (i) the sequence of five spatial subsets as determined based on spatial positions of those subsets is $\{S_1 \rightarrow S_2 \rightarrow S_3 \rightarrow S_4 \rightarrow S_5\}$ (where each Sn is a spatial lidar subset), (ii) $S_3$ and $S_4$ are designated as being potentially dynamic while $S_1, S_2$, and $S_5$ are designated as not being potentially dynamic, (iii) $R(S_4)<R(S_3)$ (where $R(x)$ is the dynamic point ratio associated with the spatial subset x), and (iv) the threshold condition(s) require that the output of the recursive traversal includes at least two contiguous spatial subsets, then the system may determine that $\{S_3, S_4\}$ corresponds to a dynamic object because $\{S_3, S_4\}$ is the output of recursive traversal of potentially dynamic lidar sets and this output includes two lidar subsets. However, if the threshold condition(s) require that the output of the recursive traversal includes at least three contiguous spatial subsets, the system may determine that the sequence of spatial subsets is not associated with any dynamic objects, because $\{S_3, S_4\}$ is the output of recursive traversal of the potentially dynamic lidar sets and this output includes less than three lidar subsets.

In some cases, the dynamic object detections (e.g., under-segmented dynamic object detections) performed in accordance with the techniques described herein may be used to control a vehicle. In some cases, the techniques herein enable more accurate dynamic object detection in a vehicle's environment, which can lead to safer trajectory planning for the vehicle. Accordingly, in some cases, the techniques described herein enable better modeling of a vehicle's environment and controlling the vehicle in a safer manner based on those more accurate vehicle environment models.

Additionally, in some cases, the techniques discussed herein can be implemented to facilitate and/or enhance safety of automated navigation features in vehicles, such as in automated vehicles or semi-automated vehicles. For example, the techniques described herein can be used to detect a dynamic object in a vehicle's environment and determine that a current trajectory of the vehicle is likely to collide with a predicted trajectory of the detected dynamic object. Upon determining that the current trajectory is likely to collide with the dynamic object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques discussed herein can be implemented in a multi-modality sensor system, such as a multi-modality system including image sensor(s) (e.g., red-green-blue (RGB) cameras), depth cameras (e.g., RGB-D cameras (e.g., time-of-flight cameras)), lidar sensors, radar sensors, and/or sonar sensors, to provide redundancy to the system in the event of hardware or software failure. For example, in the event that an image sensor is broken, the techniques described herein enable object detection based on lidar data and/or radar data (e.g., based on the combination of lidar and radar data). Thus, the techniques discussed herein provide additional improvements to computer vision systems, for example.

In some cases, the techniques described herein can be implemented to provide redundancy for a dynamic object detection model used by a vehicle. The dynamic object detection model may, for example, be a classifier model and/or a segmentation model, such as a classifier and/or segmentation model that is configured to perform object classification and/or object segmentation based on sensor data (e.g., based on lidar data). In some cases, the techniques described herein provide an alternative mechanism for detecting dynamic objects based on sensor data (e.g., based on lidar and/or radar data). Accordingly, these techniques described herein may provide redundancy in the event of failure of the default dynamic object detection model used by a vehicle computing device, and thus enhance safety and operational reliability of the vehicle computing device that uses both frameworks for dynamic object detection. In some cases, the techniques described herein may be implemented as part of a vehicle safety system (e.g., that is implemented separately from the primary vehicle computing device) to validate, provide redundancy, and/or provide error checking with respect detection(s) and/or determination(s) of a primary vehicle computing device. Examples of such vehicle safety systems are described in, for example, in U.S. patent application Ser. No. 16/218,182 titled "Collision Avoidance System with Trajectory Validation" filed Dec. 12, 2018, U.S. patent application Ser. No. 16/218,182 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference for all purposes.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Further, although described in connection with lidar data, the methods, apparatuses, and systems described herein are not limited to lidar. In one example, the methods, apparatuses, and systems may be utilized to perform computer vision operations on one or more of radar frames, depth camera frames, or image data frames. Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

FIG. 1 provides an example environment 100 for performing the techniques described herein. As depicted in FIG. 1, the environment 100 includes a vehicle 102 with a set of sensor(s) 104 and one or more computing device(s) 112. The computing device(s) 112 may include a perception component 114. The sensor(s) 104 may be example(s) of sensor(s) 506 depicted in FIG. 5 and described below in relation to that figure. The perception component 114 may be an example of the perception component 522 depicted in FIG. 5 and described below in relation to that figure.

Moreover, the computing device(s) 112 may be example(s) of vehicle computing device(s) 504 depicted in FIG. 5 and described below in relation to that figure. However, while various implementations of the techniques disclosed herein are described in relation to operation(s) performed by a vehicle computing device, a person of ordinary skill in the relevant technology will recognize that at least a subset and/or all of the disclosed operation(s) may be performed by another computing device, such as a computing device that is not on-board a vehicle and/or a backend server computing device.

As further depicted in FIG. 1, the sensor(s) 104 generate radar data 106(A) (e.g., one or more radar point clouds) and lidar data 106(B) (e.g., one or more lidar point clouds). The radar data 106(A) and the lidar data 106(B) may be associated with an environment that includes a barrier 108 and a pedestrian 110. The barrier 108 may be a static object, while the pedestrian 110 may be a dynamic object (e.g., a walking object).

As further depicted in FIG. 1, the radar data 106(A) represents a set of dynamic radar points, such as the dynamic radar point 114(A) and the dynamic radar point 114(B). A dynamic radar point may be a point in the radar data 106(B) (e.g., a radar point cloud) that is associated with a velocity measure (e.g., as determined based on the radar data 106(A)) which exceeds a threshold. In the radar data 106(A), the dynamic radar point 114(A) may be associated with a detection of the pedestrian 110 by a radar sensor. The dynamic radar point 114(B) may be unrelated to a detection of the pedestrian 110 by a radar sensor. For example, the dynamic radar point 114(B) may be a dynamic radar point generated as a result of a radar error. As another example, the dynamic radar point 114(B) may be related to the detection of an object that has not been segmented and/or detected based on the lidar data 106(B). As further depicted in FIG. 1, a lidar-based object detection routine has processed the lidar data 106(B) to detect the lidar segment 116. The lidar segment 116 may include lidar points associated with both the barrier 108 and with the pedestrian 110. However, the lidar-based object detection routine may have failed to detect lidar points associated with the pedestrian 110 as a separate lidar segment.

As further depicted in FIG. 1, the lidar segment 116 is associated with a set of radar points. The set of radar points associated with the lidar segment 116 may include a set of dynamic radar points such as the dynamic radar point 114(A) and/or a set of static radar points. In some cases, each location in the radar data 106(A) that is not highlighted with a marking is associated with a static radar point. In some cases, each location in the radar data 106(A) that is highlighted with a marking is associated with a dynamic radar point.

As described above, while various implementations of the techniques disclosed herein are described in relation to performing operations on lidar and/or radar data, a person of ordinary skill in the relevant technology will recognize that the techniques described herein may be performed in relation to one or more sensor data modalities in addition to and/or instead of at least one of the lidar or radar. For example, the radar data 106(A) may be augmented by and/or replaced by data associated with one or more sensor modalities that may generate sensor data representing object velocities, such as at least one of sensor data associated with optical flow sensors, sensor data associated with ultrasonic sensors, or sonar data. As another example, the lidar data 106(B) may be augmented by and/or replaced by data associated with one or more sensor modalities that may represent object segments and/or may be used for segmentation to detect object(s), such as at least one of image data (e.g., generated by two-dimensional cameras), sensor data associated with depth cameras, sensor data associated with infrared sensors, sensor data associated with stereoscopic camera data, sonar data, and/or the like.

In some cases, the radar data 106(A) and lidar data 106(B) are associated with the same point in time and/or the same period of time (e.g., the same point and/or period of time associated with capturing and/or receiving radar data 106(A) and/or lidar data 106(B)). In some cases, the radar data 106(A) is associated with a time period (e.g., a time period associated with capturing and/or receiving radar data 106(A)) that includes a time point and/or period associated with the lidar data 106(B) (e.g., the point and/or period associated with capturing and/or receiving lidar data 106(B)).

As further depicted in FIG. 1, the perception component 114 processes the radar data 106(A) and the lidar data 106(B) to detect a dynamic object (e.g., the pedestrian 110) in the vehicle environment associated with the radar data 106(A) and the lidar data 106(B). For example, the perception component 114 may process the radar data 106(A) and the lidar data 106(B) in accordance with the techniques described above to detect a dynamic object in the vehicle environment. As another example, the perception component 114 may process the radar data 106(A) and the lidar data 106(B) in accordance with the process 118 to detect a dynamic object in the vehicle environment. The process 118 includes the operations 120-126.

At operation 120, an example system (e.g., a system including the perception component 114, such as the computing device(s) 112) receives a lidar segment. A lidar segment may be a subset of lidar points (e.g., a subset of lidar points in a lidar point cloud) that is determined to be associated with an object detection (e.g., the detection of a static object, such as the barrier 108). For example, the lidar segment 116 may be associated with a detection of the barrier 108, which may be a static object.

At operation 122, the system receives a candidate trajectory. The candidate trajectory may be a trajectory that is being evaluated by the system to determine whether to control the vehicle based on a candidate trajectory. In some cases, the candidate trajectory is a current trajectory according to which a vehicle is being controlled. In some cases, the candidate trajectory is a predefined trajectory. For example, the candidate trajectory may be associated with driving straight at a defined speed and/or according to a speed profile. As another example, the candidate trajectory may be associated with driving in accordance with the orientation of the road (e.g., as determined based on map data and/or sensor data) at a defined speed and/or according to a speed profile. As another example, the candidate trajectory may be determined by modifying (e.g., swerving) another trajectory (e.g., a current trajectory according to which the vehicle is being controlled).

At operation 124, the system determines a set of S spatial subsets of the lidar segment based on the candidate trajectory. In some cases, the S spatial subsets are subsets of the set of lidar points in the received lidar segment. For example, the S spatial subsets may be subsets of the lidar segment 116. In some cases, to determine the S spatial subsets of the received lidar segment (e.g., the lidar segment 116), the system may determine subsets of the lidar points in the lidar segment that align with portions of an arclength. The arclength may be determined based on the candidate trajectory (e.g., may span along at least a portion of the candidate trajectory). Example techniques for determining spatial lidar subsets of a lidar segment are described in relation to FIG. 2.

At operation 126, the system determines whether the vehicle environment includes a dynamic object along the candidate trajectory based on the S spatial subsets. In some cases, the system: (i) determines which of the S spatial subsets are potentially dynamic, and (ii) recursively traverses the potentially dynamic subsets starting from the subset with the highest dynamic point ratio and in any available direction until reaching a subset that is not potentially dynamic. Example techniques for determining whether a spatial lidar subset is potentially dynamic are described in relation to FIG. 2. Example techniques for detecting a dynamic objects by recursively traversing potentially dynamic subsets of lidar data are described in relation to FIG. 3.

In some cases, if the system detects a dynamic object based on an environment portion corresponding to a candidate trajectory (e.g., along an arclength associated with the trajectory), the system may evaluate the trajectory based on the dynamic object detection. For example, the system may determine a collision risk associated with the trajectory and the detected dynamic object. The system may then determine whether to adopt and/or continue to maintain the trajectory as the vehicle's trajectory based on the determined collision risk.

Figure 2:
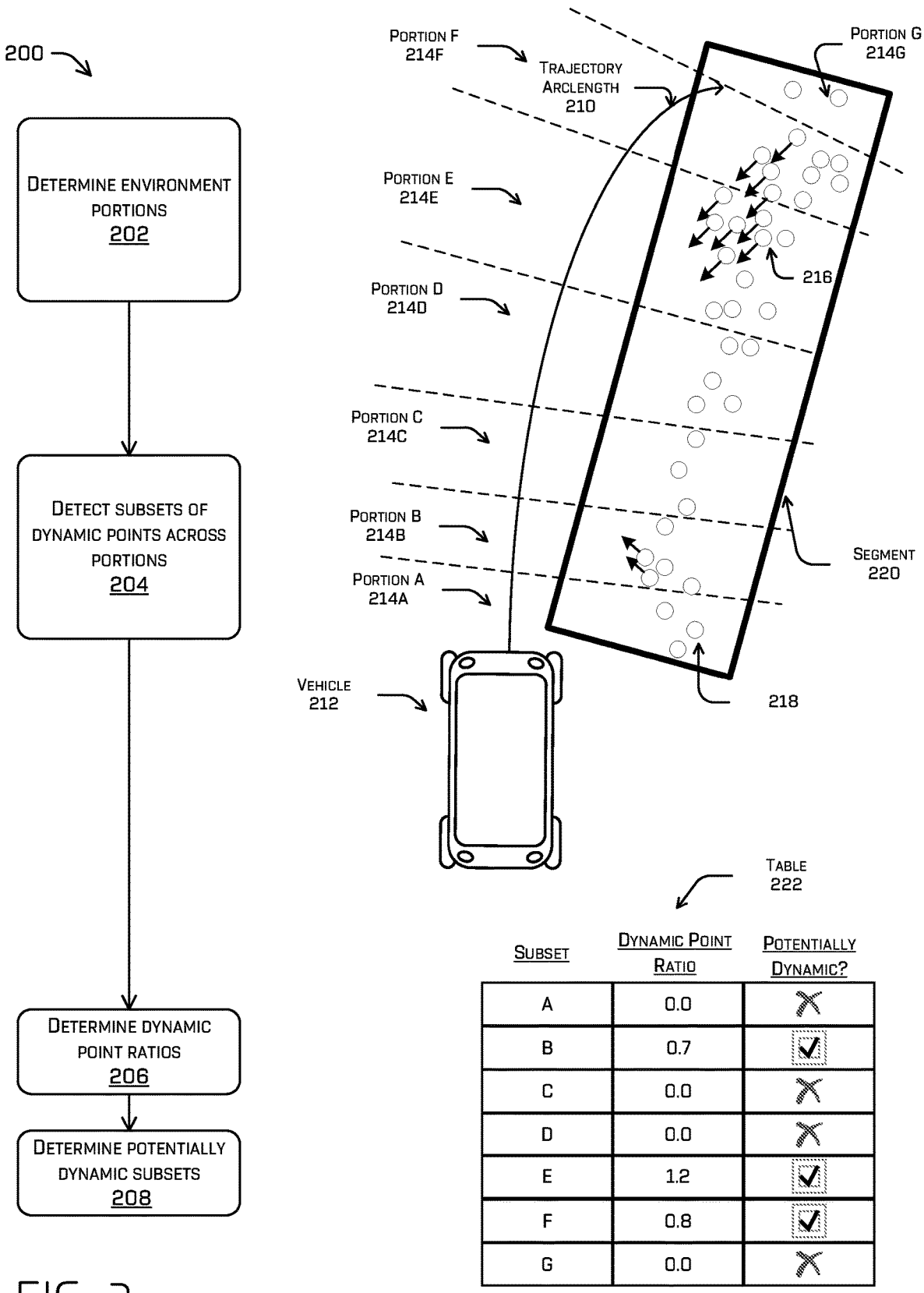
FIG. 2 is a flowchart diagram of an example process for determining one or more subsets of lidar data that may potentially be associated with dynamic object(s).

FIG. 2 is a flowchart diagram of an example process 200 for determining one or more subsets of lidar data that may potentially be associated with dynamic object(s). As depicted in FIG. 2, at operation 202, an example system determines a set of portions of a vehicle's environment. The environment portion(s) may correspond to portion(s) of an arclength associated with at least a portion of a trajectory.

For example, as depicted in FIG. 2, the vehicle 212 is associated with the trajectory arclength 210 that spans along an arc associated with the segment 220. To determine the environment portion(s), the system may divide the trajectory arclength into arclength portion(s), such as into equal-sized intervals. In the example implementation of FIG. 2, the following seven environment portions are determined: environment portion A 214A, environment portion B 214B, environment portion C 214C, environment portion D 214D, environment portion E 214E, environment portion F 214F, and environment portion G 214G. Each environment portion may be a two-dimensional portion. One of the dimension sizes associated with the two-dimensional portion may be determined based on the length of the corresponding arclength portion. Another of the dimension sizes associated with the two-dimensional portion may be determined based on a fixed value (e.g., a vehicle's safety corridor value) and/or based on a width and/or length of a lidar segment (e.g., a lidar segment associated with an object detection, such as the static object detection) at a corresponding region (e.g., a region of the lidar segment that is aligned with the arclength portion).

At operation 204, the system determines one or more spatial subsets of lidar data based on the determined environment portion(s). In some cases, the lidar data associated with a relevant lidar segment may be divided into a set of spatial subsets, where each subset may include lidar points that fall within a respective one of the environment portion(s).

For example, as depicted in FIG. 2, the lidar points associated with a lidar segment 220 that spans across the trajectory arclength 210 are divided into seven spatial lidar subsets: a spatial subset including the lidar points that fall within the environment portion A 214A (e.g., a spatial subset including the lidar point 218), a spatial subset including the lidar points that fall within the environment portion B 214B, a spatial subset including the lidar points that fall within the environment portion C 214C, a spatial subset including the lidar points that fall within the environment portion D 214D, a spatial subset including the lidar points that fall within the environment portion E 214E (e.g., a spatial subset including the lidar point 216), a spatial subset including the lidar points that fall within the environment portion F 214F, and a spatial subset including the lidar points that fall within the environment portion G 214G.

At operation 206, the system determines a dynamic point ratio for each spatial lidar subset based on a count of dynamic lidar points and a count of static lidar points in the spatial subset. For example, the system may determine the dynamic point ratio for a spatial lidar subset based on a count of dynamic lidar points in the spatial subset to a count of static lidar points in the subset. As described above, in some cases, a lidar point may be designated as being dynamic if an associated radar point is designated as being dynamic (e.g., as having a threshold-exceeding velocity measure).

For example, as depicted in FIG. 2, lidar points that are depicted as having arrows (e.g., the lidar point 216) are designated as dynamic, while lidar points depicted without arrows (e.g., the lidar point 218) are designated as static. The system may then use these designations to determine the dynamic point ratios depicted in table 222.

For example, table 222 associates the spatial lidar subset A, which includes lidar points associated with the environment portion A 214A, with a dynamic point ratio of 0.0, as the environment portion A 214A includes zero dynamic lidar points and three static lidar points (e.g., ⅔=0.0). As another example, table 222 associates the spatial lidar subset B, which includes lidar points associated with the environment portion B 214B, with a dynamic point ratio of 0.7, as the environment portion B 214B includes two dynamic lidar points and three static lidar points (e.g., ⅔≈0.7). As another example, table 222 associates the spatial lidar subset C, which includes lidar points associated with the environment portion C 214C, with a dynamic point ratio of 0.0, as the environment portion C 214C includes zero dynamic lidar points and three static lidar points (e.g., 0/3=0.0). As another example, table 222 associates the spatial lidar subset D, which includes lidar points associated with the environment portion D 214D, with a dynamic point ratio of 0.0, as the environment portion D 214D includes zero dynamic lidar points and five static lidar points (e.g., 0/5=0.0). As another example, table 222 associates the spatial lidar subset E, which includes lidar points associated with the environment portion E 214E, with a dynamic point ratio of 1.2, as the environment portion E 214E includes six dynamic lidar points and five static lidar points (e.g., 6/5=1.2). As another example, table 222 associates the spatial lidar subset F, which includes lidar points associated with the environment portion F 214F, with a dynamic point ratio of 0.8, as the environment portion F 214F includes four dynamic lidar points and five static lidar points (e.g., 4/5=0.8). As another example, table 222 associates the spatial lidar subset G, which includes lidar points associated with the environment portion G 214G, with a dynamic point ratio of 0.0, as the environment portion G 214G includes zero dynamic lidar points and two static lidar points (e.g., 0/2=0.0).

At operation 208, the system determines which spatial lidar subsets are potentially dynamic based on the dynamic point ratios associated with the subsets. In some cases, the system determines that a spatial lidar subset is potentially dynamic if the dynamic point ratio associated with the subset exceeds a threshold (e.g., a threshold of 0.0, 0.2, 0.5, and/or the like). In some cases, the system determines that a spatial lidar subset is potentially dynamic if the dynamic point ratio associated with the subset exceeds a threshold and/or one or more other conditions are satisfied (e.g., the neighboring spatial subset(s) have dynamic point ratios that exceeds the same or other threshold(s)).

For example, as depicted in FIG. 2, given a threshold that is lower than 0.8, the system may determine that spatial lidar subsets B, E, and F, which are associated with the dynamic point ratios of 0.7, 1.2, and 0.8 respectively, are potentially dynamic. Moreover, given a threshold that is zero or higher, the system may determine that spatial lidar subsets A, C, D, and G, all of which are associated with a dynamic point ratios of 0.0, are not potentially dynamic.

Figure 3:
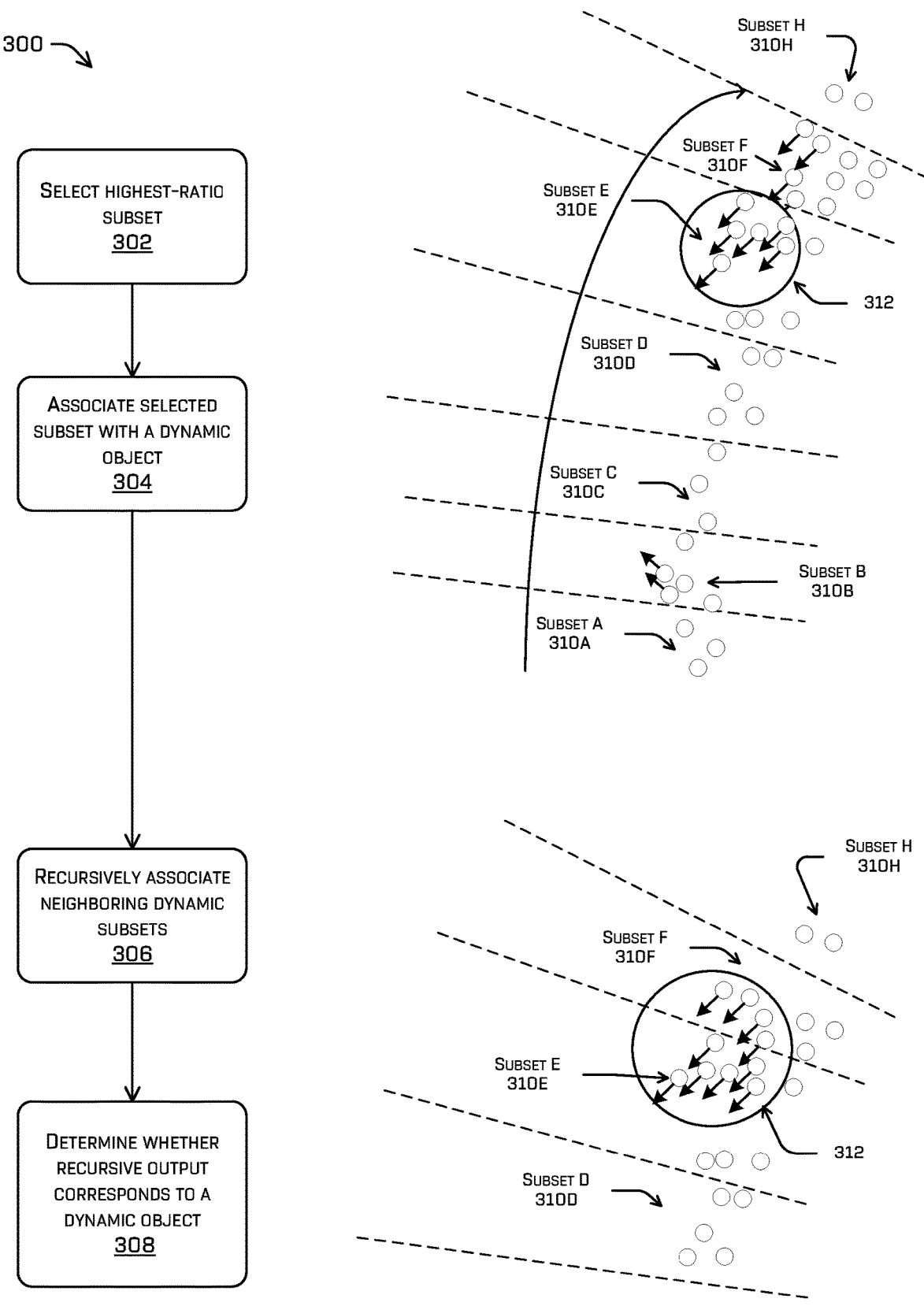
FIG. 3 is a flowchart diagram of an example process for determining whether a lidar segment is associated with a dynamic object based on spatial subsets associated with the lidar segment.

FIG. 3 is a flowchart diagram of an example process 300 for determining whether a lidar segment is associated with a dynamic object based on spatial subsets associated with the lidar segment. As depicted in FIG. 3, at operation 302, an example system selects the spatial lidar subset with the highest dynamic point ratio. For example, as depicted in FIG. 3, the system may select the spatial lidar subset E 310E because the dynamic point ratio of the lidar subset E 310E (e.g., the dynamic point ratio of 1.2) exceeds the dynamic point ratios of other depicted lidar subsets: specifically, the dynamic point ratio of the lidar subset A 310A (e.g., the dynamic point ratio of 0.0), the dynamic point ratio of the lidar subset B 310B (e.g., the dynamic point ratio of 0.7), the dynamic point ratio of the lidar subset C 310C (e.g., the dynamic point ratio of 0.0), the dynamic point ratio of the lidar subset D 310D (e.g., the dynamic point ratio of 0.0), the dynamic point ratio of the lidar subset F 310F (e.g., the dynamic point ratio of 0.8), and the dynamic point ratio of lidar subset H 310H (e.g., the dynamic point ratio of 0.0).

At operation 304, the system associates the dynamic lidar points in the selected spatial lidar subset with a recursive traversal output. For example, as depicted in FIG. 3, the recursive traversal output 312 includes the dynamic lidar points in the selected spatial lidar subset, which is the spatial lidar subset E 310E.

At operation 306, the system recursively traverses the spatial lidar points from the selected spatial lidar subset in any available direction until reaching a spatial lidar subset that is determined to not be potentially dynamic. The system may associate the dynamic lidar points in any traversed spatial subset to the recursive traversal output.

For example, as depicted in FIG. 3, the system may initially traverse starting from the spatial lidar subset E 310E both in the forward (e.g., upward) direction and in the backward (e.g., downward) direction. In the backward direction, the traversal may first reach spatial lidar subset D 310D and stop, because the spatial lidar subset D 310D is not determined to be potentially dynamic (e.g., has a dynamic point ratio that falls below or equals a threshold). Accordingly, the system may terminate backward traversal and refrain from adding any lidar points in the spatial lidar subset D 310D to the recursive traversal output 312.

As further depicted in FIG. 3, in the forward direction, the traversal may first reach spatial lidar subset F 310F but not terminate, because the spatial lidar subset F 310F is determined to be potentially dynamic (e.g., has a dynamic point ratio that exceeds a threshold). Accordingly, the system may add the dynamic lidar points associated with the spatial lidar subset F 310F to the recursive traversal output 312 and continue the traversal to spatial lidar subset H 310H. At this point, the system may terminate the forward traversal based on determining that the spatial lidar subset F 310F is not determined to be potentially dynamic (e.g., has a dynamic point ratio that falls below or equals a threshold). Accordingly, the system may terminate backward traversal and refrain from adding any lidar points in the spatial lidar subset F 310F to the recursive traversal output 312. Therefore, at the end of the recursive traversal operation(s), the recursive traversal output may include the dynamic lidar points in the spatial lidar subset E 310E and the dynamic lidar points in the spatial lidar subset F 310F.

At operation 308, the system determines whether the recursive traversal output corresponds to a dynamic object. In some cases, the system always associates the dynamic lidar points in the recursive traversal output to a dynamic object detection. In some cases, the system associates the dynamic lidar points in the recursive traversal output to a dynamic object detection if those dynamic lidar points satisfy one or more requirements. For example, in some cases, the system may only associate dynamic lidar points in the recursive traversal output to a dynamic object detection if the recursive traversal output includes at least a threshold number of dynamic lidar points, includes dynamic lidar points associated with at least a threshold number of spatial lidar subsets and/or at least a threshold length, includes dynamic lidar points associated with a set of spatial lidar subsets that include at least a threshold number of static lidar points, and/or the like.

Figure 4:
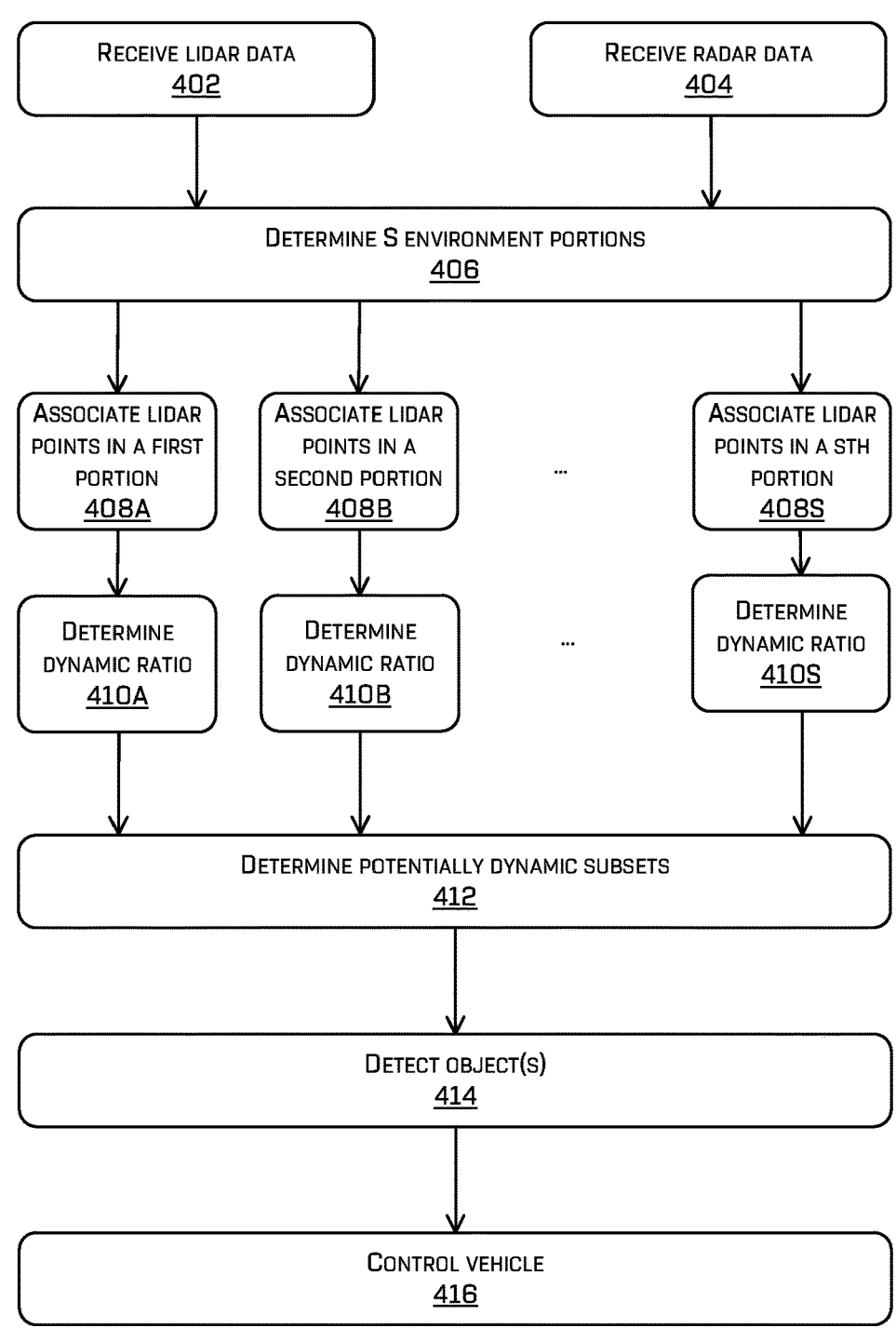
FIG. 4 is a flowchart diagram of an example process for controlling a vehicle based on lidar data and radar data.

FIG. 4 is a flowchart diagram of an example process 400 for controlling a vehicle based on lidar data and radar data. However, a described above, while various implementations of the techniques disclosed herein are described in relation to performing operations on lidar and/or radar data, a person of ordinary skill in the relevant technology will recognize that the techniques described herein may be performed in relation to one or more sensor data modalities in addition to and/or instead of at least one of the lidar or radar.

At operation 402, an example system receives lidar data. The lidar data may include one or more lidar point clouds, such as a set of lidar point clouds each associated with a timestamp. In some cases, the lidar data includes lidar data associated with an entire lidar scan and/or an entire lidar scene at a particular time (e.g., associated with the full field-of-view of a lidar sensor, such as a 360-degree field-of-view of the lidar sensor).

At operation 404, the system receives radar data. The radar data may include one or more lidar point clouds, such as a set of radar point clouds each associated with a timestamp. In some cases, the radar data includes radar data associated with an entire scene at a particular time (e.g., associated with the full field-of-view of a radar sensor, such as a 360-degree field-of-view of the radar sensor).

At operation 406, the system determines S environment portions. An environment portion may be a portion of a vehicle's environment along an axis and/or an arc. The axis and/or the arc may span a dimension (e.g., width and/or length) of a lidar segment detected in the lidar data. An environment portion may be a portion of a segment of the environment that is determined to be associated with an object based on lidar data (e.g., via performing segmentation operation(s) and/or classification operation(s) based on the lidar data). In some cases, an environment portion is a portion of an environment that is within a region corresponding to a lidar segment and aligned with a portion of an arclength, such as an arclength associated with a trajectory. The arclength may span at least a portion of the trajectory and/or a dimension of the lidar segment.

At operations 408A-408S, the system determines S spatial subsets of lidar data based on the S environment portions. The system may associate the lidar points of a lidar segment that are within a common environment portion to a common spatial lidar subset. For example, at operation 408A, the system associates lidar segment points in a first determined environment portion to a first spatial lidar subset. As another example, at operation 408B, the system associates lidar segment points in a second determined environment portion to a second spatial lidar subset. As another example, at operation 408S, the system associates lidar segment points in an Sth determined environment portion to an Sth spatial lidar subset.

At operations 410A-410S, the system determines S dynamic point ratios for the S spatial lidar subsets. The system may determine the dynamic point ratio for a spatial subset based on a count of the dynamic lidar points in the spatial subset and a count of static lidar points in the spatial subset. For example, at operation 410A, the system determines a first dynamic point ratio for the first spatial subset (e.g., based on a ratio of the dynamic lidar points in the first spatial subset to all dynamic lidar points in that subset). As another example, at operation 410B, the system determines a second dynamic point ratio for the second spatial subset (e.g., based on a ratio of the dynamic lidar points in the second spatial subset to all dynamic lidar points in that subset). As another example, at operation 410S, the system determines an Sth dynamic point ratio for the second spatial subset (e.g., based on a ratio of the dynamic lidar points in the Sth spatial subset to all dynamic lidar points in that subset).

At operation 412, the system determines which of the S spatial lidar subsets are potentially dynamic based on the S dynamic point ratios. For example, the system may determine that a spatial lidar subset is potentially dynamic if the dynamic point ratio associated with the spatial lidar subset exceeds a threshold.

At operation 414, the system detects a dynamic object based on the subset of S spatial lidar subsets that are determined to be potentially dynamic. For example, in some cases, the system recursively traverses the potentially dynamic subsets starting from the subset with the highest dynamic point ratio and in any available direction until reaching a subset that is not potentially dynamic. The system then may then determine a dynamic object based on the dynamic lidar points associated with those traversed subsets that are determined to be potentially dynamic.

At operation 416, the system controls a vehicle based on the dynamic object detection. In some cases, the system may determine a collision risk associated with a candidate trajectory and/or a current trajectory and the detected dynamic object. The system may then determine whether to adopt and/or continue to maintain the trajectory as the vehicle's trajectory based on the determined collision risk. The system may control the vehicle to reduce and/or minimize the collision risk and/or other cost measure associated with the vehicle.

Figure 5:
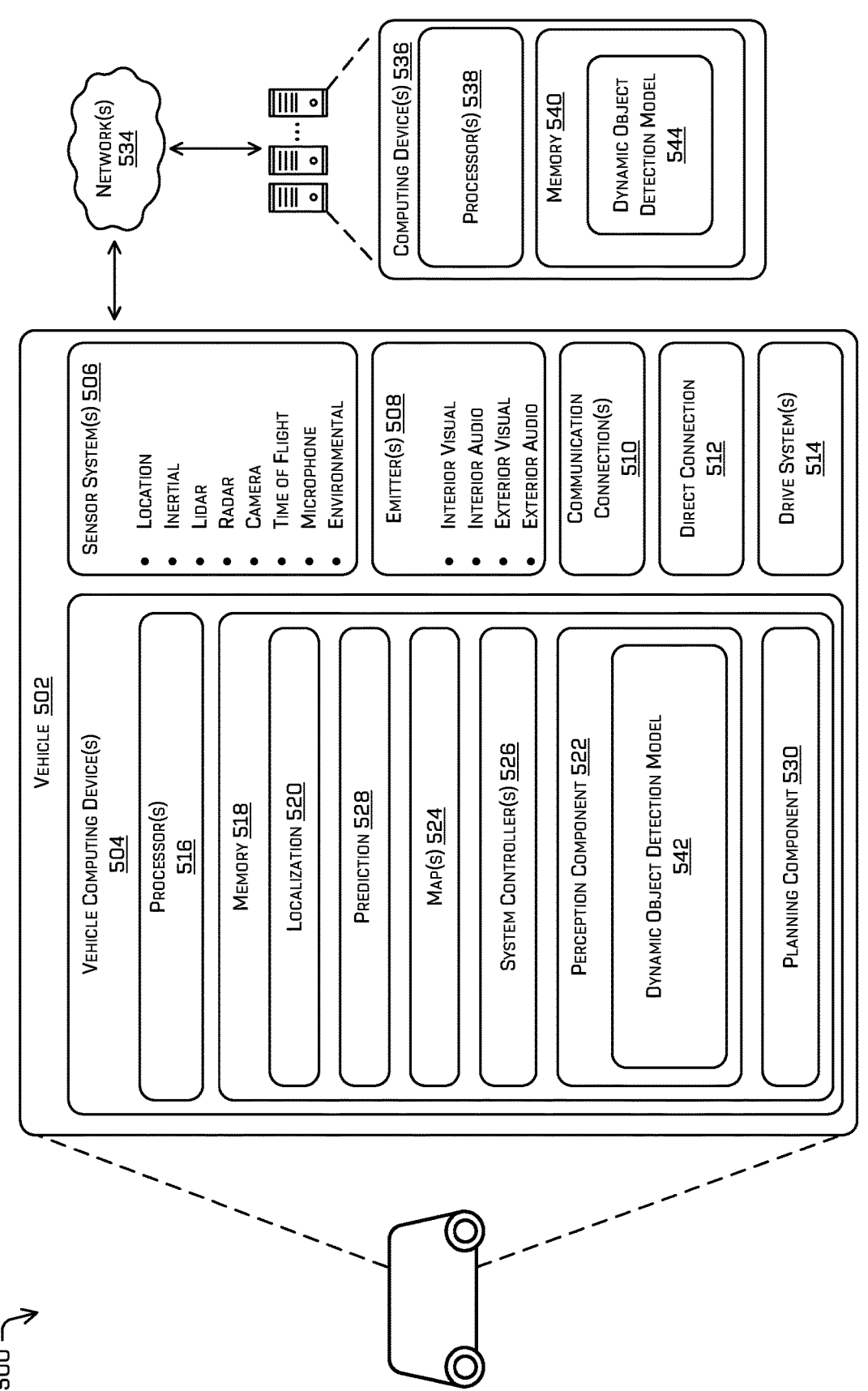
FIG. 5 depicts a block diagram of an example system for implementing various techniques described herein.

FIG. 5 depicts a block diagram of an example system 500 for implementing various techniques described herein. In some instances, the example system 500 may include a vehicle 502. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 502 can be configured to perform various techniques described herein, including detecting sensor data inconsistencies by comparing the sensor data in overlapping regions captured by different sensors. The vehicle 502 also may be configured to determine causes of sensor data inaccuracies and/or responses by the vehicle 502 to the sensor data inaccuracies, using the various techniques described herein.

The vehicle 502 may include vehicle computing device(s) 504, sensor(s) 506, emitter(s) 508, network interface(s) 510, at least one direct connection 512 (e.g., for physically coupling with the vehicle to exchange data and/or to provide power), and one or more drive system(s) 514. The system 500 may additionally or alternatively comprise vehicle computing device(s) 504.

In some instances, the sensor(s) 506 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 536.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, and/or the like), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns, and/or the like) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive systems(s) 514. Also, the network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 536. In some examples, computing device(s) 536 may comprise one or more nodes of a distributed computing system (e.g., a cloud computing architecture).

The network interface(s) 510 may include physical and/or logical interfaces for connecting the vehicle computing device(s) 504 to another computing device or a network, such as network(s) 534. For example, the network interface(s) 510 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor(s) 506 may send sensor data, via the network(s) 534, to the computing device(s) 536 at a particular frequency, after a lapse of a predetermined period of time, in near real-time, etc.

In some instances, the vehicle 502 may include one or more drive systems(s) 514 (or drive components). In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive systems(s) 514 may include one or more wheel encoders (e.g., rotary encoders) to sense rotation of the wheels of the drive components, inertial sensors (e.g., inertial measure-ment units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 514. In some cases, the sensor(s) on the drive systems(s) 514 may overlap or supplement corresponding systems of the vehicle 502 (e.g., sensor(s) 506).

The drive systems(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 514 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 514. Furthermore, the drive systems(s) 514 may also include one or more communication connection(s) that enable communication by the respective drive component with one or more other local or remote computing device(s).

The vehicle computing device(s) 504 may include processor(s) 516 and memory 518 communicatively coupled with the one or more processors 516. Computing device(s) 536 may also include processor(s) 538, and/or memory 540. As described above, the memory 540 of the computing device(s) 536 may store and execute dynamic object detection model 544, for example using the techniques described herein.

The processor(s) 516 and/or 538 may be any suitable processor capable of executing computer-executable instructions to process data and perform operations as described herein. By way of example and not limitation, the processor(s) 516 and/or 538 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 518 and/or 540 may be examples of non-transitory computer-readable media. The memory 518 and/or 540 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and/or memory 540 may store a localization component 520, perception component 522, maps 524, system controller(s) 526, prediction component 528, and/or planning component 530.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include map(s) of an environment and can continuously determine a location, velocity, and/or orientation of the autonomous vehicle within the map(s). In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the planning component 530 and/or to the prediction component 528, a location and/or orientation of the vehicle 502 relative to the environment and/or sensor data associated therewith.

The memory 518 can further include one or more maps 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 524 may include at least one map (e.g., images and/or a mesh) generated in accordance with the techniques discussed herein. In some examples, the vehicle 502 can be controlled based at least in part on the maps 524. That is, the maps 524 can be used in connection with the localization component 520, the perception component 522, and/or the planning component 530 to determine a location of the vehicle 502, identify objects in an environment, and/or generate routes and/or trajectories to navigate within an environment.

In some instances, the perception component 522 may comprise a primary perception system and/or a prediction system implemented in hardware and/or software. The perception component 522 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or or acceleration associated with an object), and/or the like. Data determined by the perception component 522 may be referred to as perception data. The perception component may include and/or execute in an online manner the operations of a dynamic object detection model 542, for example using the techniques described herein.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 528 may include functionality to generate predicted information associated with objects in an environment. As an example, the prediction component 528 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 528 can generate one or more predicted positions, predicted velocities, predicted trajectories, etc., for such target objects based on attributes of the target object and/or other objects proximate the target object.

The planning component 530 may receive a location and/or orientation of the vehicle 502 from the localization component 520, perception data from the perception component 522, and/or predicted trajectories from the prediction component 528, and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 526 and/or drive systems(s) 514 may parse/cause to be carried out, second instructions for the emitter(s) 508 may be formatted according to a second format associated therewith). In at least one example, the planning component 530 may comprise a nominal trajectory generation subcomponent that generates a set of candidate trajectories, and selects a trajectory for implementation by the drive systems(s) 514 based at least in part on determining a cost and/or score associated with a trajectory according to U.S. patent application Ser. No. 16/517,506, filed Jul. 19, 2019 and/or U.S. patent application Ser. No. 16/862,284, filed May 11, 2020, the entirety of which are incorporated herein by reference for all purposes.

The memory 518 and/or 540 may additionally or alternatively store a mapping system (e.g., generating a map based at least in part on sensor data), a planning system, a ride management system, etc. Although localization component 520, perception component 522, the prediction component 528, the planning component 530, and/or system controller(s) 526 are illustrated as being stored in memory 518, any of these components may include processor-executable instructions, machine-learned model(s) (e.g., a neural network), and/or hardware and all or part of any of these components may be stored on memory 540 or configured as part of computing device(s) 536.

As described herein, the localization component 520, the perception component 522, the prediction component 528, the planning component 530, and/or other components of the system 500 may comprise one or more ML models. For example, the localization component 520, the perception component 522, the prediction component 528, and/or the planning component 530 may each comprise different ML model pipelines. The prediction component 528 may use a different ML model or a combination of different ML models in different circumstances. For example, the prediction component 528 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 518 may additionally or alternatively store one or more system controller(s) 526, which may be configured to control steering, propulsion, braking, safety, emitters, communication, and other systems of the vehicle 502. These system controller(s) 526 may communicate with and/or control corresponding systems of the drive systems(s) 514 and/or other components of the vehicle 502.

In an additional or alternate example, vehicle 502 and/or computing device(s) 536 may communicate (e.g., transmit and/or receive messages over network(s) 534) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 502. For example, the passenger device may additionally or alternatively comprise a display and/or one or more input/output devices, such as a touchscreen, microphone, speaker, and/or the like. In some examples, the vehicle 502 may transmit messages and/or receive messages from the passenger device.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: A system comprising: one or more processors; and one or more non-transitory computer-readable media storing computer-executable instructions that, when executed, cause the one or more processors to perform operations comprising: receiving a candidate trajectory for an autonomous vehicle to traverse through an environment, wherein the candidate trajectory comprises a first segment associated with a first portion of the environment, a second segment associated with a second portion of the environment that is adjacent to the first portion, and a third segment associated with a third portion of environment; receiving radar data from a radar sensor associated with the autonomous vehicle; receiving lidar data from a lidar sensor associated with the autonomous vehicle; determining, based on the radar data and the lidar data, that the first portion and the second portion are associated with a dynamic movement pattern and the third segment is associated with a static movement pattern, wherein determining that the first portion is associated with the dynamic movement pattern comprises: determining that the first portion is associated with a first set of lidar points in the lidar data, determining, based on the radar data, that a first subset of the first subset is associated with the dynamic movement pattern, determining a first ratio based on the first subset and the first set, and determining that the first ratio exceeds a threshold; based at least in part on determining that the first portion and the second portion are associated with the dynamic movement pattern, and that the first portion is adjacent to the second portion, determining that the first portion and the second portion are associated with a dynamic object in the environment; based at least in part on determining that the third portion is associated with the static movement pattern, determining that the third portion is associated with a static object in the environment; determining a score associated with the candidate trajectory based on the dynamic object and the static object; and controlling the autonomous vehicle based on the score.

B: The system of paragraph A, wherein: the first segment is determined based on a section of an arclength associated with the candidate trajectory, the first portion is a two-dimensional portion, a first dimension size associated with the first portion is determined based on a length of the first segment, and a second dimension size associated with the first portion is determined based on a safety corridor associated with the autonomous vehicle.

C: The system of paragraph A or B, wherein determining that the first portion is associated with the dynamic movement pattern comprises: determining that a first lidar point in the first set is associated with a first radar point represented by the radar data; and determining that the first radar point is associated with the dynamic movement pattern.

D: The system of paragraph C, wherein determining that the first lidar point is associated with the first radar point comprises: generating a tree structure comprising a first node associated with a first position in the environment and a second node associated with a second position in the environment; determining that a third position is associated with the first lidar point is closer to the first position than to the second position; and determining that the first node is associated with the first radar point.

E: The system of any of paragraphs A-D, wherein determining that the first portion and the second portion are associated with the dynamic object comprises: determining a second set of lidar points associated with the second portion; determining a second ratio associated with a second subset of the second set, wherein the second subset is associated with the dynamic movement pattern; determining that the first ratio exceeds the second ratio; based at least in part on determining that the first ratio exceeds the second ratio, determining that the dynamic object is associated with the first portion; and based at least in part on determining that the first portion is adjacent to the second portion, determining that the dynamic object is associated with the second portion.

F: One or more non-transitory computer-readable media storing instructions executable by one or more processors, wherein the instructions, when executed, cause the one or more processors to perform operations comprising: receiving first sensor data and second sensor data associated with an environment of a vehicle, wherein the second sensor data comprises velocity data, and wherein the first sensor data comprises a first set of points associated with a first portion of the environment; determining, based at least in part on the second sensor data, a first subset of the first set that is associated with a dynamic movement pattern; determining a first ratio based on the first subset and the first set; based at least in part on determining that the first ratio exceeds a threshold, determining that the first portion is associated with a dynamic object in the environment; and controlling the vehicle based on the dynamic object.

G: The one or more non-transitory computer-readable media of paragraph F, wherein: the first portion is associated with a first segment of a candidate trajectory associated with the vehicle.

H: The one or more non-transitory computer-readable media of paragraph G, wherein the first segment is within a threshold distance from a position associated with the vehicle.

I: The one or more non-transitory computer-readable media of paragraph G or H, wherein: the first portion is a two-dimensional portion, a first dimension size associated with the first portion is determined based on a length of the first segment, and a second dimension size associated with the first portion is determined based on a safety corridor associated with the vehicle.

J: The one or more non-transitory computer-readable media of any of paragraphs G-I, the operations further comprising: determining a score for the candidate trajectory based on the dynamic object, and determining, based on the score, whether to control the vehicle based on the candidate trajectory.

K: The one or more non-transitory computer-readable media of any of paragraphs F-J, wherein determining that the first subset is associated with a dynamic movement pattern comprises: determining that a first point in the first subset is associated with a second point represented by the second sensor data; and determining that the second point is associated with the dynamic movement pattern.

L: The one or more non-transitory computer-readable media of paragraph K, wherein determining that the first point is associated with the second point comprises: generating a tree structure comprising a first node associated with a first position in the environment and a second node associated with a second position in the environment; determining that a third position is associated with the first point is closer to the first position than to the second position; and determining that the first node is associated with the second point.

M: The one or more non-transitory computer-readable media of any of paragraphs F-L, wherein determining the first ratio is based on a first count associated with the first subset and a second count associated with a second subset of the first set that is associated with a static movement pattern.

N: A method comprising: receiving first sensor data and second sensor data associated with an environment of a vehicle, wherein the second sensor data comprises velocity data, and wherein the first sensor data comprises a first set of points associated with a first portion of the environment; determining, based at least in part on the second sensor data, a first subset of the first set that is associated with a dynamic movement pattern; determining a first ratio based on the first subset and the first set; based at least in part on determining that the first ratio exceeds a threshold, determining that the first portion is associated with a dynamic object in the environment; and controlling the vehicle based on the dynamic object.

O: The method of paragraph N, wherein: the first portion is associated with a first segment of a candidate trajectory associated with the vehicle.

P: The method of paragraph O, wherein the first segment is within a threshold distance from a position associated with the vehicle.

Q: The method of paragraph O or P, wherein: the first portion is a two-dimensional portion, a first dimension size associated with the first portion is determined based on a length of the first segment, and a second dimension size associated with the first portion is determined based on a safety corridor associated with the vehicle.

R: The method of any of paragraphs O-Q, further comprising: determining a score for the candidate trajectory based on the dynamic object, and determining, based on the score, whether to control the vehicle based on the candidate trajectory.

S: The method of any of paragraphs N-R, wherein determining that the first subset is associated with a dynamic movement pattern comprises: determining that a first point in the first subset is associated with a second point represented by the second sensor data; and determining that the second point is associated with the dynamic movement pattern.

T: The method of paragraph S, wherein determining that the first point is associated with the second point comprises: generating a tree structure comprising a first node associated with a first position in the environment and a second node associated with a second position in the environment; determining that a third position is associated with the first point is closer to the first position than to the second position; and determining that the first node is associated with the second point.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:

one or more processors; and one or more non-transitory computer-readable media storing computer-executable instructions that, when executed, cause the one or more processors to perform operations comprising:

receiving a candidate trajectory for an autonomous vehicle to traverse through an environment, wherein the candidate trajectory comprises a first segment associated with a first portion of the environment, a second segment associated with a second portion of the environment that is adjacent to the first portion, and a third segment associated with a third portion of the environment;

receiving radar data from a radar sensor associated with the autonomous vehicle;

receiving lidar data from a lidar sensor associated with the autonomous vehicle;

determining, based on the radar data and the lidar data, that the first portion and the second portion are associated with a dynamic movement pattern and the third segment is associated with a static movement pattern, wherein determining that the first portion is associated with the dynamic movement pattern comprises:

determining that the first portion is associated with a first set of lidar points in the lidar data, determining, based on the radar data, that a first subset of the first set is associated with the dynamic movement pattern, determining a first ratio based on the first subset and the first set, and determining that the first ratio exceeds a threshold;

based at least in part on determining that the first portion and the second portion are associated with the dynamic movement pattern, and that the first portion is adjacent to the second portion, determining that the first portion and the second portion are associated with a dynamic object in the environment;

based at least in part on determining that the third portion is associated with the static movement pattern, determining that the third portion is associated with a static object in the environment;

determining a score associated with the candidate trajectory based on the dynamic object and the static object; and controlling the autonomous vehicle based on the score.

2. The system of claim 1, wherein:

the first segment is determined based on a section of an arclength associated with the candidate trajectory, the first portion is a two-dimensional portion, a first dimension size associated with the first portion is determined based on a length of the first segment, and a second dimension size associated with the first portion is determined based on a safety corridor associated with the autonomous vehicle.

3. The system of claim 1, wherein determining that the first portion is associated with the dynamic movement pattern comprises:

determining that a first lidar point in the first set is associated with a first radar point represented by the radar data; and determining that the first radar point is associated with the dynamic movement pattern.

4. The system of claim 3, wherein determining that the first lidar point is associated with the first radar point comprises:

generating a tree structure comprising a first node associated with a first position in the environment and a second node associated with a second position in the environment;

determining that a third position is associated with the first lidar point is closer to the first position than to the second position; and determining that the first node is associated with the first radar point.

5. The system of claim 1, wherein determining that the first portion and the second portion are associated with the dynamic object comprises:

determining a second set of lidar points associated with the second portion;

determining a second ratio associated with a second subset of the second set, wherein the second subset is associated with the dynamic movement pattern;

determining that the first ratio exceeds the second ratio;

based at least in part on determining that the first ratio exceeds the second ratio, determining that the dynamic object is associated with the first portion; and based at least in part on determining that the first portion is adjacent to the second portion, determining that the dynamic object is associated with the second portion.

6. One or more non-transitory computer-readable media storing instructions executable by one or more processors, wherein the instructions, when executed, cause the one or more processors to perform operations comprising:

receiving first sensor data and second sensor data associated with an environment of a vehicle, wherein the second sensor data comprises velocity data, and wherein the first sensor data comprises a first set of points associated with a first portion of the environment;

determining, based at least in part on the second sensor data, a first subset of the first set that is associated with a dynamic movement pattern;

determining a first ratio based on the first subset and the first set;

based at least in part on determining that the first ratio exceeds a threshold, determining that the first portion is associated with a dynamic object in the environment; and controlling the vehicle based on the dynamic object.

7. The one or more non-transitory computer-readable media of claim 6, wherein:

the first portion is associated with a first segment of a candidate trajectory associated with the vehicle.

8. The one or more non-transitory computer-readable media of claim 7, wherein the first segment is within a threshold distance from a position associated with the vehicle.

9. The one or more non-transitory computer-readable media of claim 7, wherein:

the first portion is a two-dimensional portion, a first dimension size associated with the first portion is determined based on a length of the first segment, and a second dimension size associated with the first portion is determined based on a safety corridor associated with the vehicle.

10. The one or more non-transitory computer-readable media of claim 7, the operations further comprising:

determining a score for the candidate trajectory based on the dynamic object, and determining, based on the score, whether to control the vehicle based on the candidate trajectory.

11. The one or more non-transitory computer-readable media of claim 6, wherein determining that the first subset is associated with the dynamic movement pattern comprises:

determining that a first point in the first subset is associated with a second point represented by the second sensor data; and determining that the second point is associated with the dynamic movement pattern.

12. The one or more non-transitory computer-readable media of claim 11, wherein determining that the first point is associated with the second point comprises:

generating a tree structure comprising a first node associated with a first position in the environment and a second node associated with a second position in the environment;

determining that a third position is associated with the first point is closer to the first position than to the second position; and determining that the first node is associated with the second point.

13. The one or more non-transitory computer-readable media of claim 6, wherein determining the first ratio is based on a first count associated with the first subset and a second count associated with a second subset of the first set that is associated with a static movement pattern.

14. A method comprising:

receiving first sensor data and second sensor data associated with an environment of a vehicle, wherein the second sensor data comprises velocity data, and wherein the first sensor data comprises a first set of points associated with a first portion of the environment;

determining, based at least in part on the second sensor data, a first subset of the first set that is associated with a dynamic movement pattern;

determining a first ratio based on the first subset and the first set;

based at least in part on determining that the first ratio exceeds a threshold, determining that the first portion is associated with a dynamic object in the environment; and controlling the vehicle based on the dynamic object.

15. The method of claim 14, wherein:

the first portion is associated with a first segment of a candidate trajectory associated with the vehicle.

16. The method of claim 15, wherein the first segment is within a threshold distance from a position associated with the vehicle.

17. The method of claim 15, wherein:

the first portion is a two-dimensional portion, a first dimension size associated with the first portion is determined based on a length of the first segment, and a second dimension size associated with the first portion is determined based on a safety corridor associated with the vehicle.

18. The method of claim 15, further comprising:

determining a score for the candidate trajectory based on the dynamic object, and determining, based on the score, whether to control the vehicle based on the candidate trajectory.

19. The method of claim 14, wherein determining that the first subset is associated with the dynamic movement pattern comprises:

determining that a first point in the first subset is associated with a second point represented by the second sensor data; and determining that the second point is associated with the dynamic movement pattern.

20. The method of claim 19, wherein determining that the first point is associated with the second point comprises:

generating a tree structure comprising a first node associated with a first position in the environment and a second node associated with a second position in the environment;

determining that a third position is associated with the first point is closer to the first position than to the second position; and determining that the first node is associated with the second point.

* * * * *